United States Patent

Rezaiifar et al.

Patent Number: 6,011,796
Date of Patent: Jan. 4, 2000

[54] EXTENDED RANGE SEQUENCE NUMBERING FOR SELECTIVE REPEAT DATA TRANSMISSION PROTOCOL

[75] Inventors: Ramin Rezaiifar; Edward G. Tiedemann, Jr.; Paul E. Bender; James D. Tomcik, all of San Diego, Calif.

[73] Assignee: QUALCOMM Incorporated, San Diego, Calif.

[21] Appl. No.: 08/877,294

[22] Filed: Jun. 17, 1997

[51] Int. Cl.[7] .................................................. H04L 12/56
[52] U.S. Cl. ............................................ 370/394; 370/470
[58] Field of Search ................................... 370/394, 474, 370/470, 471, 476, 522

[56] References Cited

U.S. PATENT DOCUMENTS

| | | | |
|---|---|---|---|
| 4,439,859 | 3/1984 | Donnan | 371/32 |
| 4,617,657 | 10/1986 | Drynan et al. | 370/60 |
| 5,151,899 | 9/1992 | Thomas et al. | 370/394 |
| 5,291,483 | 3/1994 | Nagai et al. | 370/474 |
| 5,337,313 | 8/1994 | Buchholz et al. | 370/394 |
| 5,784,362 | 7/1998 | Turina | 370/321 |

OTHER PUBLICATIONS

TIA/EIA/IS–99 Interim Standard Data Services Option for Wideband Spread Spectrum Digital Cellular System, Jul. 1995.

*Primary Examiner*—Min Jung
*Attorney, Agent, or Firm*—Russell B. Miller; Brian Edmonston; Roger W. Martin

[57] ABSTRACT

A method and apparatus for extending the sequence numbering range for a selective repeat transmission protocol is described. In accordance with one embodiment of the invention, data frames are transmitted including an eight-bit sequence number and a one-bit retransmit flag. The one bit retransmit flag indicates whether the frame is newly transmitted or retransmitted due to a failed first transmission. The transmit and receive systems each maintain a twelve-bit sequence number referred to as a "long sequence numbers" comprised of the eight-bit sequence number transmitted with each frame and a four-bit extension. The long sequence number is transmitted within control frames and the eight-bit sequence number is transmitted within the data frames.

9 Claims, 8 Drawing Sheets

EXTENDED RANGE SEQUENCE NUMBERING FOR SELECTIVE REPEAT DATA TRANSMISSION PROTOCOL

BACKGROUND OF THE INVENTION

I. Field of the Invention

The present invention relates to data communications. More particularly, the present invention relates to a novel method and apparatus for extending the sequence numbering range applicable to selective repeat transmission protocols.

II. Description of the Related Art

FIG. 1 is a block diagram of a personal communication system configured in accordance with the use of the IS-95 over-the-air interface standard. The IS-95 standard, and its derivatives such as IS-95-A, IS-99 and IS-707, IS-657 and ANSI J-STD-008 etc. (referred to herein collectively as the IS-95 standards), defines an interface for implementing a digital personal communication system using code division multiple access (CDMA) signal processing techniques. Also, a personal communication system configured substantially in accordance with the use of IS-95 is described in U.S. Pat. No. 5,103,459 entitled "System and Method for Generating Signal Waveforms in a CDMA Personal communication System" assigned to the assignee of the present invention and incorporated herein by reference.

As is typical for most personal communication systems, IS-95 allows mobile telephone service to be provided to a set of wireless terminals (typically cellular telephones) using a set of base station 12 coupled to the public switched telephone network (PSTN) 18 by a transmitter controller (BSC) 14 and a mobile switching center (MSC) 16. During a telephone call, a wireless terminal 10 interfaces with one or more base stations 12 using CDMA modulated radio frequency (RF) signals. The RF signal transmitted from the base station 12 to the wireless terminal 10 is referred to as the forward link, and the RF signal transmitted from the wireless terminal 10 to the base station 12 is referred to as the reverse link.

Under the IS-99 and IS-707 standards (referred to hereinafter simply as IS-707), an IS-95 compliant communications system can also provide data communications services. Data communications services allow digital data to be exchanged using receiver 10 and the RF interface to one or more transmitters 12. Examples of the type of digital data typically transmitted using the IS-707 standard include computer files and electronic mail.

In accordance with both the IS-95 and IS-707 standards, the data exchanged between a wireless terminal 10 and a base station 12 is processed in frames. To increase the likelihood that a frame will be successfully transmitted during a data transmission, IS-707 employs a radio link protocol (RLP) to track the frames transmitted successfully, and to perform frame retransmission when a frame is not transmitted successfully. Retransmission is performed up to three (3) times IS-707, and it is the responsibility of the higher layer protocols to take additional steps to ensure the frame transmitted is successfully.

In order to track which frames have been transmitted successfully, IS-707 calls for an eight-bit sequence number to be included in each frame transmitted. The sequence number is incremented for each frame from 0 to 256 and then reset back to zero. An unsuccessfully transmitted frame is detected when a frame with an out of order sequence number is received, or an error is detected using CRC checksum information or other error detection methods. Once an unsuccessfully transmitted frame is detected, the receive transmits a negative-acknowledgment message (NAK) to the transmit system that includes the sequence number of the frame that was not received. The transmit system then retransmits the frame including the sequence number as originally transmitted. If the retransmitted frame is not received successfully, a second negative-acknowledgment message is sent to the transmit system. The transmit system typically responds by notifying the controlling application or network layer of the failed transmission.

Under IS-95A and IS-707, frames are transmitted once every 20 milliseconds (ms). Thus, an eight-bit sequence number can track 256 frames transmitted over a five (5) second interval. Five seconds is typically sufficient to allow a failed frame transmission to be detected, and a retransmission to be performed, and therefore an eight-bit sequence number provides sufficient time for frame retransmission. Thus, retransmitted frames can be uniquely identified without ambiguity caused by a sequence "wrap-around" whereby the eight bit sequence number repeats.

Since the original development of IS-95A and IS-707, however, additional protocols and standards have been proposed and developed that allow data to be transmitted at greater rates. Typically, these new protocols and standards use the same frame structure as IS95A and IS707 in order to maintain as much compatibility as possible with pre-existing systems and standards. However, while maintaining compatibility with pre-existing standards and systems is desirable, the use of the same type of frame within these higher rate protocols and standards substantially increases the number of frames that are transmitted during a given period of time. For example, if the transmission rate is increased by a factor of four, the time required to transmit 256 frames is reduced to 1.25 seconds, rather than the five seconds required previously. A time period of 1.25 seconds is typically insufficient to allow a failed frame transmission to be detected, and a retransmission attempted, before the eight-bit sequence number repeats. Thus, the use of an eight-bit sequence number is insufficient to allow unique identification frames for the time period necessary to perform the desired retransmission sequence.

While the number of bits in the sequence number could be increased, such an increase would substantially alter the frame format and therefore violate the goal of maintaining substantial compatibility with previously existing systems and standards. Thus, the present invention is directed to a method and apparatus for extending the sequence number range without modifying the number of bits used for the sequence number.

SUMMARY OF THE INVENTION

The present invention is a novel and improved method and apparatus for extending the sequence numbering range for a selective repeat transmission protocol. In accordance with one embodiment of the invention, data frames are transmitted including an eight-bit sequence number and a one-bit retransmit flag. The one bit retransmit flag indicates whether the frame is newly transmitted or retransmitted due to a failed first transmission. The transmit and receive systems each maintain a twelve-bit sequence number referred to as a "long sequence number" comprised of the eight-bit sequence number transmitted with each frame and a four-bit extension. The long sequence number is transmitted within control frames and the eight-bit sequence number is transmitted within the data frames.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for extending the sequence numbering range for a selective repeat transmission protocol is described. In the following description the invention is set forth in the context of a personal communication system operating in accordance with the use CDMA signal processing techniques of the IS707 and IS95 standards. While the invention is especially suited for use within such a communications system, it should be understood that the present invention may be employed in various other types of communications systems which transmit data via frames or packets, including both wireless and wireline communication system, as well as satellite based communication systems. Additionally, throughout the application, various well known systems are set forth in block form. This is done in order to avoid unnecessarily obscuring the disclosure of the invention.

Figure 1:
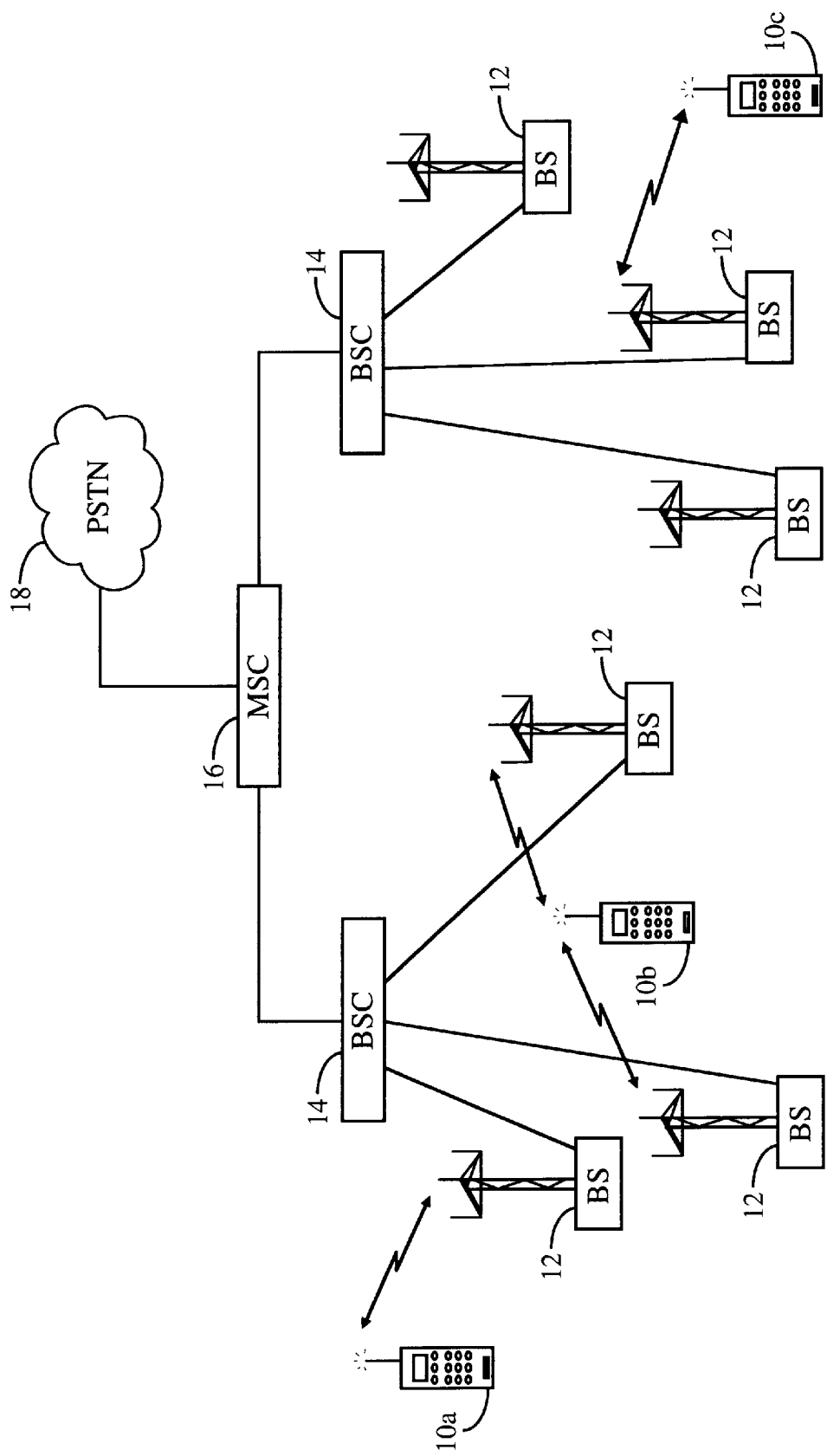
FIG. 1 is a block diagram of a personal communication system.
Figure 2:
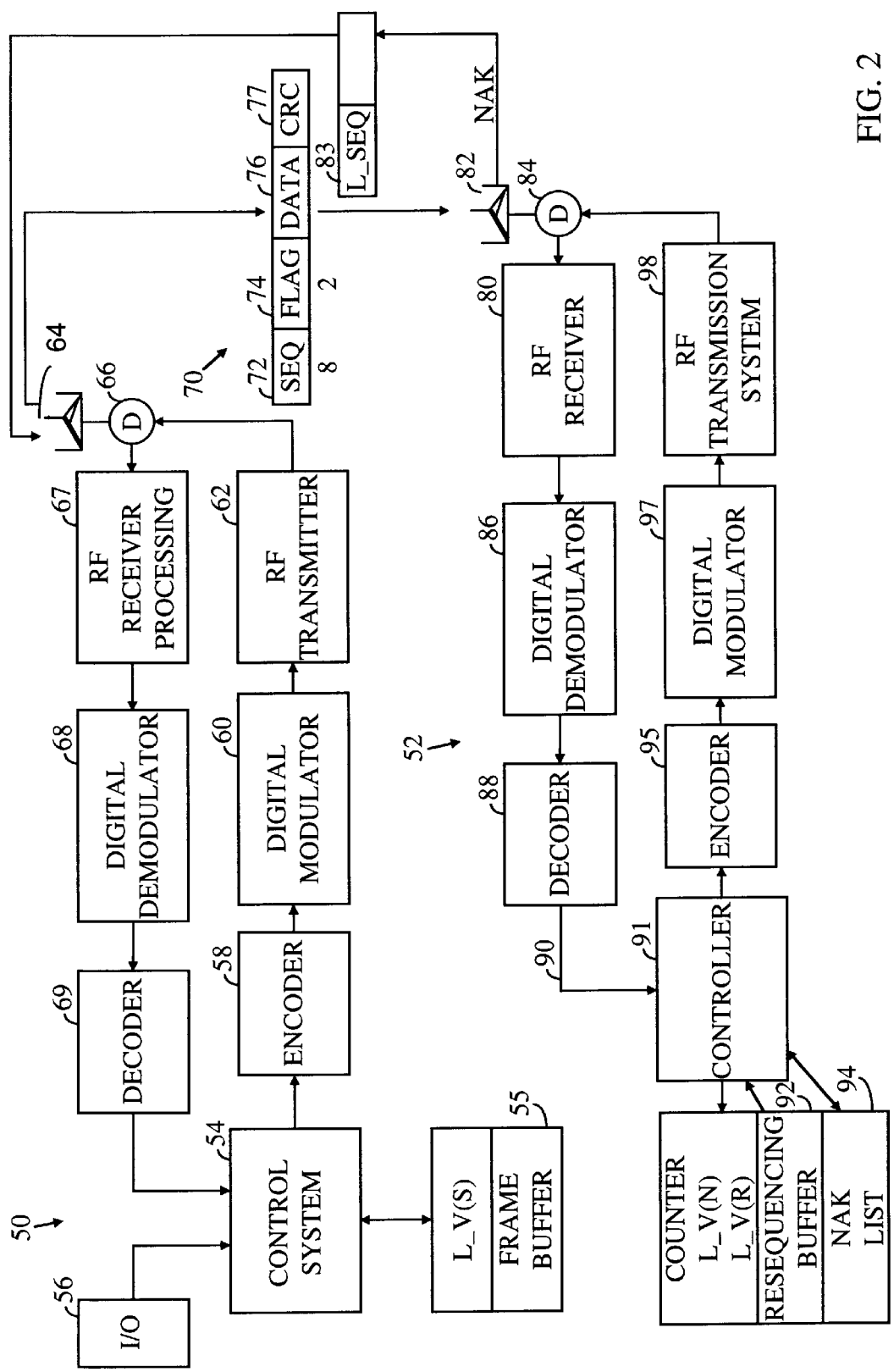
FIG. 2 is a schematic diagram of a transmitter and receiver.

FIG. 2 is a block diagram of two communication systems configured in accordance with an exemplary embodiment of the invention. The higher rate communication is being conducted from transmitter 50 to receiver 52. In an exemplary configuration, transmitter 50 is located in a base station 12 and receiver 52 is in a wireless terminal 10, however, the locations may be reversed. Within transmitter 50, control system 54 receives data frames from input/output (I/O) 56 and provides that data to encoder 58. Encoder 58 performs convolutional encoding generating code symbols that are received by digital modulator 60. Digital modulator 60 performs direct sequence modulation on the code symbols with one or more binary channel codes and one or more binary spreading codes yielding chipped symbols that are received by radio frequency (RF) transmitter 62. The chipped symbols are upconverted to the carrier frequency band by RF transmitter 62 and transmitted from antenna system 64 via diplexer 66.

Various methods and apparatus for performing the digital modulation and RF upconversion can be employed in the present invention. A set of particularly useful methods and apparatus are described in copending U.S. patent applications Ser. No. 08/431,180 entitled "Method and Apparatus for providing Variable Rate Data In A Communications System Using Statistical Multiplexing" filed on Apr. 28, 1995, Ser. No. 08/395,960 entitled "Method and Apparatus For Providing Variable Rate Data In A Communications Systems Using Non-Orthogonal Overflow Channels" filed Feb. 28, 1995, and Ser. No. 08/784,281 "High Data Rate Supplemental Channel for CDMA Telecommunications System" filed Jan. 15, 1997 all of which are assigned to the assignee of the present invention and incorporated herein by reference. It should be understood that some of the above referenced patent applications are directed to the forward link, and therefore more suited for use with the transmitter 50, while others are directed to the reverse link and therefore more suited for use with the receiver 52.

In an exemplary embodiment of the invention the data transmitted from antenna system 64 is formatted in accordance with frame 70 which includes eight-bit sequence field (SEQ number) 72, retransmit flag 74, CRC field 77 and data field 76. A frame 70 may include other fields that are not shown because they are not particularly relevant to the present invention. In a preferred embodiment of the invention, the frames are formatted substantially in accordance with the frame structures defined in the IS-707 standard, with the addition of retransmit flag 74.

To provide data frames to encoder 58 in an orderly manner, control system 54 stores the frames within frame buffer 55 and updates an index value L__V(S). Frame buffer 55 and index value L__V(S) are preferably stored within a memory system. In a preferred embodiment of the invention, index value L__V(S) is a twelve bit sequence number that is incremented after the transmission of each frame as described in greater detail below. The least significant eight bits of index value L__V(S) are placed in the sequence field of a frame 72.

Within receiver 52, RF receiver 80 downconverts and digitizes the RF signals on which frame 70 is transmitted using antenna system 82 and diplexer 84. Digital demodulator 86 demodulates the downconverted, or "baseband," signals using the necessary binary codes generating soft decision data that is received by decoder 88. Decoder 88 performs maximum likelihood trellis or Viterbi decoding yielding hard decision data 90 that is provided to controller 91.

Controller 91 reforms frame 70 using hard decision data 90 and determines whether the frame has been received in sequence relative to the frames that have already been received using the SEQ number, index variable L__V(N) and L__V(R) as well as resequencing buffer 92 and NAK list 94 as described in further detail below.

If controller 91 determines that the frame has been received out of sequence relative to the frames that have already been received, or if the frame is received in error, it generates a negative-acknowledgment (NAK) message that is received by encoder 95. Encoder performs convolutional encoding to generate code symbols that are direct sequence spread spectrum modulated by digital modulator 97, preferably in accordance with the IS95 reverse link, and the chipped symbols are upconverted by RF transmit system 98 and transmitted as NAK from antenna system 82 via diplexer 84. The L__SEQ 83 for the NAKed frame is stored within NAK list 94.

Referring again to transmitter 50, RF receiver 67 receives the RF signal via antenna system 64 and diplexer 66. RP receiver 67 downconverts and digitizes the RF signal yielding samples that are demodulated using digital demodulator 68. Decoder 69 decodes the soft decision data from digital demodulator 68 and control system 54 receives the hard decision data from decoder 69 thereby detecting the NAK from receiver 52 contained in the hard decision data.

Control system 54 receives NAK 83 and retrieves the NAKed frame from transmit buffer 55. The retrieved frames are retransmitted in accordance with the original transmission as described above (including the original sequence number).

Figure 3:
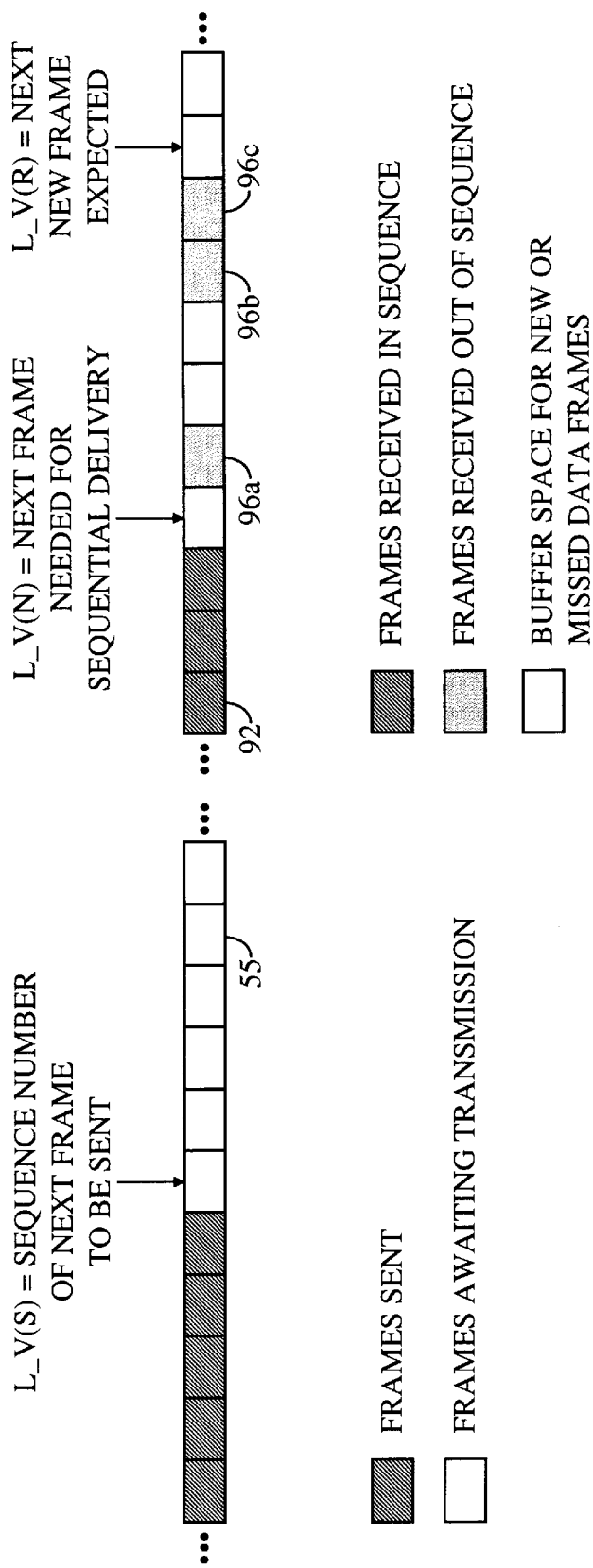
FIG. 3 is a diagram of a frame buffer and resequencing buffer.

FIG. 3 is a diagram illustrating the configuration of frame buffer 55, resequencing buffer 92, and indexes L__V(S), L__V(N) and L__V(R) when used in accordance with one embodiment of the invention. Within the transmit frame buffer 55, frames already transmitted once are shaded, and frames to be transmitted are clear. In the preferred embodiment of the invention, indexes L__V(S), L__V(N) and L__V(R) are twelve (12) bit numbers. Index L__V(S) is set to the sequence number of the next frame to be transmitted. When the frame is actually transmitted, the eight-bit SEQ number of the frame is set to the eight least significant bits of index L__V(S).

Within resequencing buffer 92, index L__V(R) is set to the twelve bit sequence of the next new frame expected. Index L__V(N) is set to the 12-bit sequence of the next frame needed for sequential delivery, or for which processing is still pending. When a predetermined number of NAK's have been sent without receipt of the corresponding frame, attempted processing of the frame is terminated and the data with the missing frame is passed to the higher layer protocols (e.g., the transport layer). As shown, NAKed frames 96*a*–*c* can be received with sequence numbers between L__V(N) and (L__V(R)−1) MOD 4096, inclusively.

Figure 4:
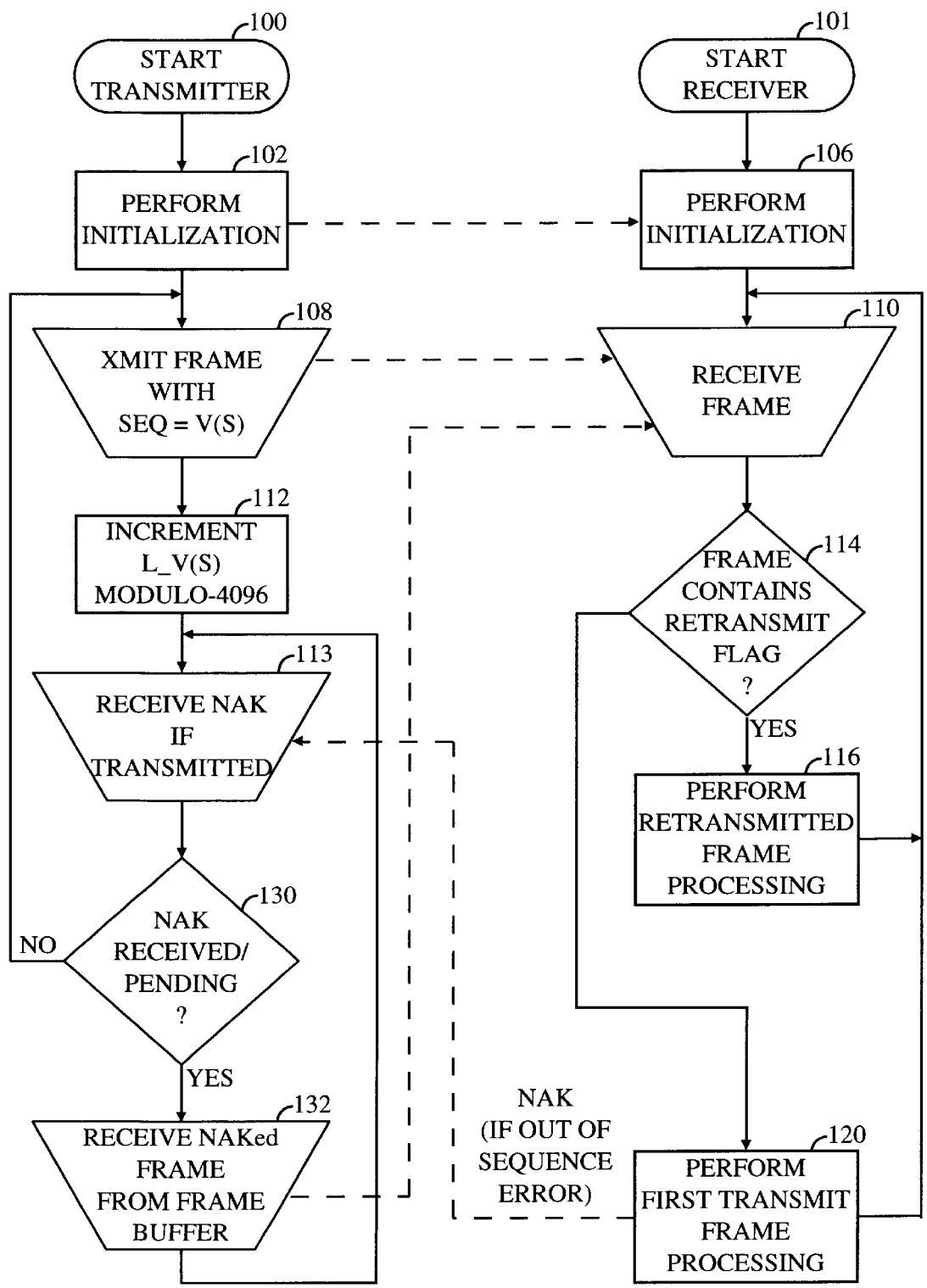
FIG. 4 is a flow chart illustrating the operation a transmitter and a receiver during a communication.

FIG. 4 is a flow diagram illustrating the operation of the transmitter 50 and receiver 52 during a communication performed in accordance with one embodiment of the invention. The transmission begins at the transmitter at step 100, and reception at the receiver at step 101. At step 102, initialization is performed during which index L__V(S) is set to zero within transmitter 50 and L__V(R) is set to zero within receiver 52.

At step 108, the transmitter transmits a frame (indicated by the dashed line) when data is available for transmission, with the SEQ number of the frame set to the eight least significant bits of index L__V(S), referred to as V(S). Additionally, the retransmit flag is set to zero to indicate the frame is a newly transmitted frame. At step 112, index L__V(S) is incremented MOD 4096, and at step 113 the transmitter performs receive processing for any NAK message transmitted from receiver 52. In one embodiment of the invention, when no data is available "idle" frames having the current SEQ number may be sent repeatedly until data becomes available (idle transmissions not shown).

At step 130 the transmitter determines if a NAK has been received or is pending, and if so the NAKed frames are retrieved from the transmit buffer using the long sequence number contained in the NAK message and retransmitted at step 132 with the original SEQ number and the retransmit field set to one. Once the frame is retransmitted the pending or received NAK is cleared and processing then continues at step 113.

If a NAK message has not been received or is not pending, the transmitter returns to step 108 and the processing continues.

Within receiver 52, the processing begins at step 101 and at step 106 L__V(S) is received from transmitter 50. At step 110, receiver 52 receives any frames transmitted from transmitter 50 at either step 108 (new transmission), or at step 132 (retransmission), and at step 114 examines the status of the retransmit flag of the frame to determine if the received frame is a retransmitted frame or a new frame. If the frame is a retransmitted frame, retransmit processing is performed at step 116, and then the receiver returns to step 110. If the frame is not a retransmitted frame, first transmit processing of the frame is performed at step 120, and then step 110 is performed again.

Figure 5:
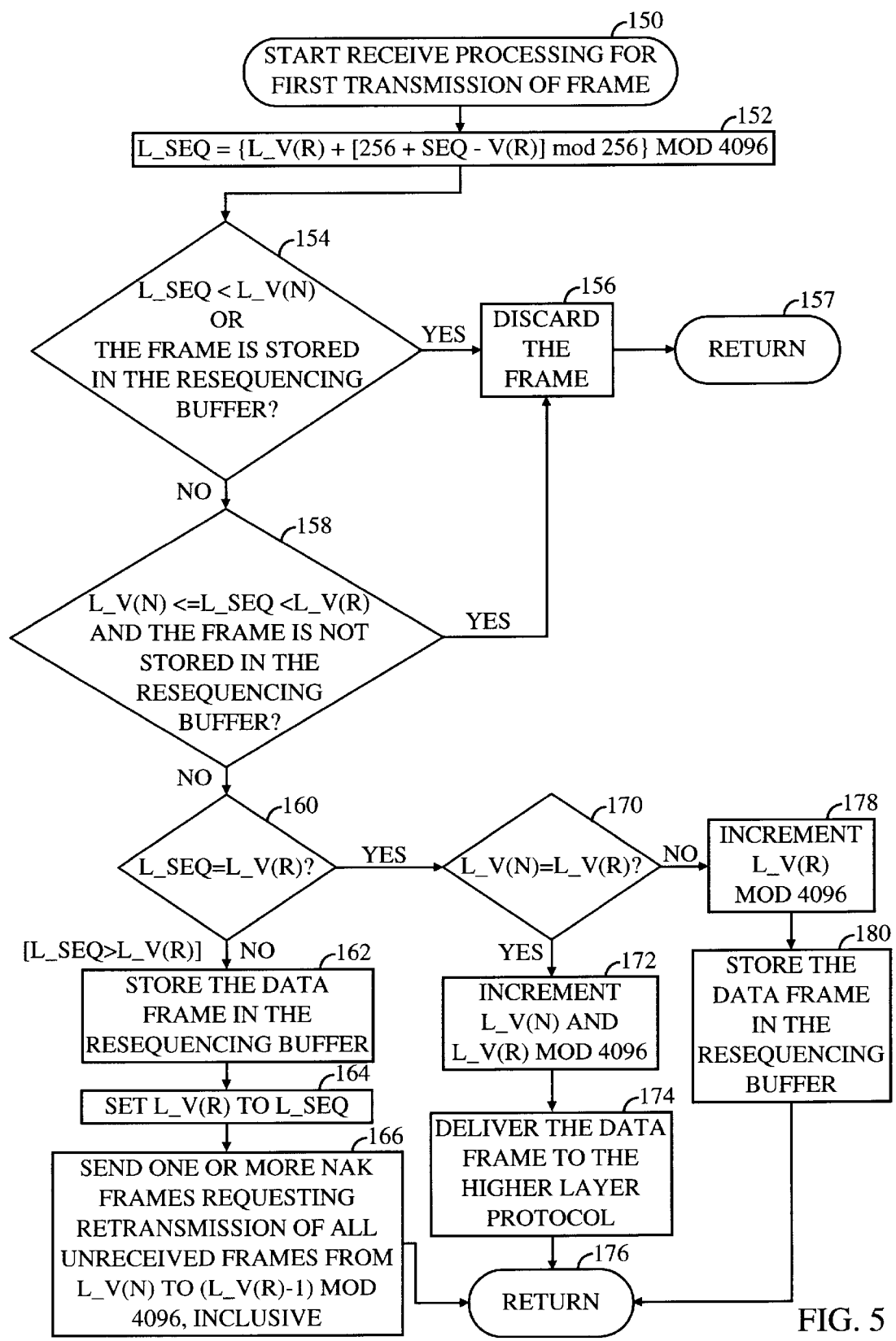
FIG. 5 is a flow chart illustrating the operation of the receiver during the reception of a newly transmitted frame.

FIG. 5 is a flow chart illustrating the operation of receiver 52 when processing the first transmission of a frame during step 120 of FIG. 4 in accordance with one embodiment of the invention. The first transmission processing begins at step 150 and at step 152 L__SEQ is set according to the following equation:

$$L\_SEQ = \{L\_V(R) + [256 + SEQ - V(R)] MOD\ 256\} MOD\ 4096, \quad (1)$$

where V(R) is the eight least significant bits of L__V(R) and SEQ is the sequence number contained in the SEQ field of the frame being processed. At step 154 it is determined whether L__SEQ is less than L__V(N) or that the frame has been stored in the resequencing buffer. If so, the frame is discarded at step 156 and the receive system returns from first transmission processing at step 157. As noted above, L__V(N) is set to the next frame needed for sequential delivery of the data.

If L__SEQ is not less than L__V(N) and the frame has not been stored in the resequencing buffer, it is further determined at step 158 whether L__SEQ is greater than or equal to L__V(N) and less than L__V(R), and whether the frame has been not stored in the resequencing buffer, and if so the frame is discarded at step 156 and the receive system returns from first transmission processing at step 157. Otherwise, it is further determined at step 160 whether L__SEQ equals L__V(R) and therefore is the next frame needed for sequential delivery L__V(R).

If L__SEQ does not equal L__V(R), an out of order frame has been received, and the frame is stored in the resequencing buffer at step 162 and L__V(R) is set to L__SEQ at step 164. At step 166, the receive system transmits one or more NAK messages requesting retransmission of all unreceived frames from L__V(N) to (L__V(R)−1) MOD 4096 inclusive. The receive system then returns from the first transmission processing at step 176.

If, at step 160, it is determined that L__SEQ equals L__V(R) the frame has been received in order, causing it to further be determined at step 170 whether L__V(N) equals L__V(R) indicating no NAKed frames are outstanding. If L__V(N) equals L__V(R), L__N(N) and L__V(R) are incremented MOD 4096 at step 172. The data frame is delivered to the higher layer protocol at step 174 and the receiver returns from first transmit processing at step 176.

If it is determined at step 160 that L__V(N) does not equals L__V(R), and therefore that NAKed frames remain outstanding, L__V(R) is incremented MOD 4096 at step 178, and at step 180 the frame is stored in the resequencing buffer. The receiver 52 then returns from the first frame transmit processing at step 176.

Figure 6:
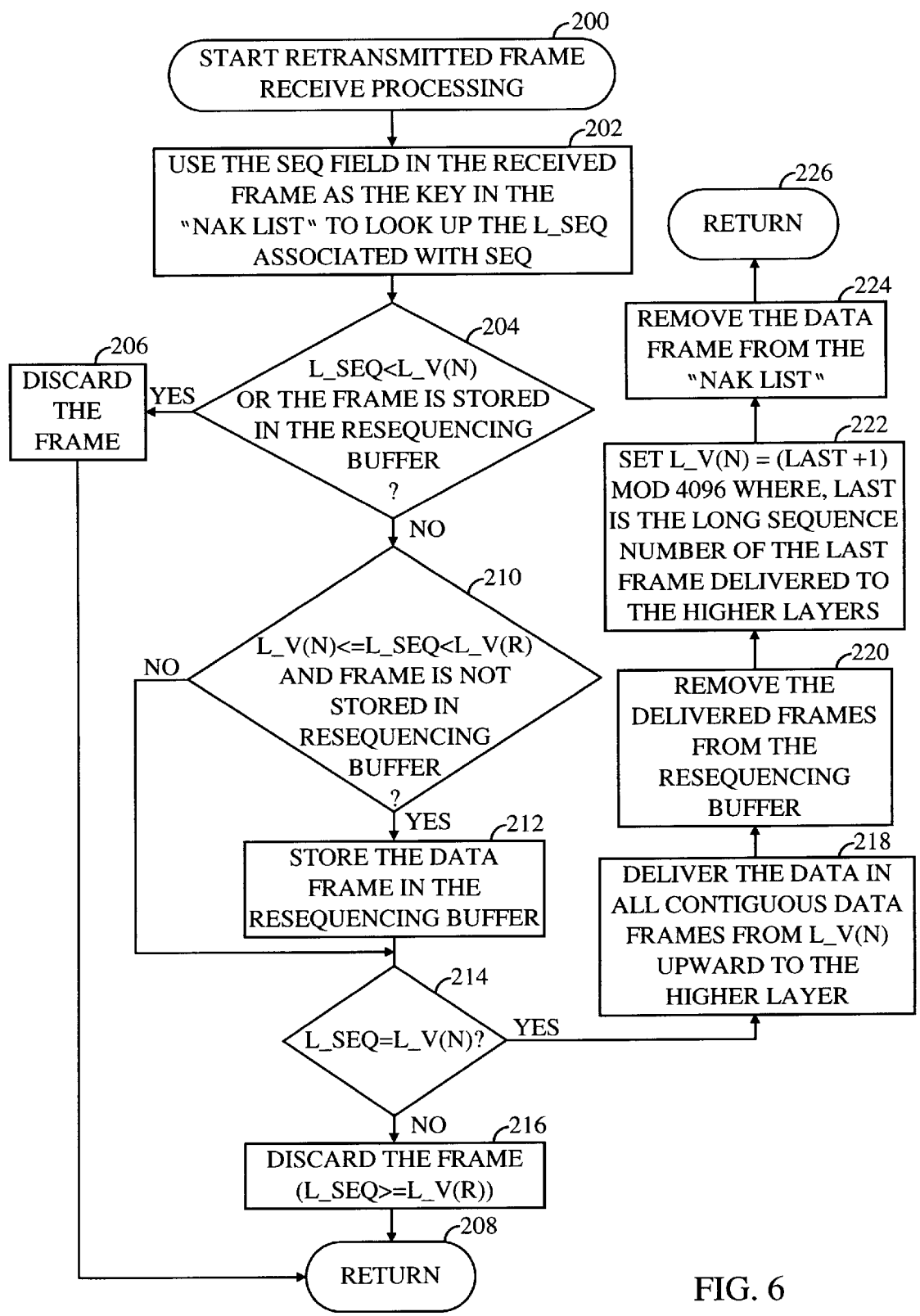
FIG. 6 is a flow chart illustrating the operation of the receiver during the reception of a retransmitted frame.

FIG. 6 is a flow diagram illustrating the operation of the receiver 52 during step 116 when a retransmitted frame is received in accordance with one embodiment of the invention. The processing of the retransmitted frame begins at step 200 and at step 202 the SEQ field in the received frame is used as the key to look up an L__SEQ associated with the SEQ in the NAK list 94 (FIG. 2). At step 204 it is determined whether the L__SEQ is less than L__V(N), or whether the frame has already been stored in the resequencing buffer, and if so the frame is discarded at step 206 and the receiver 52 returns from retransmit processing at step 208.

If L__SEQ is not less than L__V(N) and the frame has not been stored in the resequencing buffer, it is further determined at step 210 whether L_SEQ is greater than or equal to L_V(N) and less than L_V(R) and if the frame has not been stored in the resequencing buffer, and if so the frame is stored in the resequencing buffer at step 212 before step 214 is performed. Otherwise, step 214 is performed.

At step 214, it is determined whether L_SEQ is equal to L_V(N) and if not the frame is discarded at step 216 since the retransmitted frame has a sequence number that is higher than the next new frame expected and therefore and error has occurred. Once the frame has been discarded receiver 52 returns from retransmitted frame processing at step 208.

If L_SEQ equals L_V(N), the data in all the contiguous frames formed by the addition of the retransmitted frame being processed from L_V(N) upward are delivered to the next higher processing layer at step 218, and the delivered frames are removed from the resequencing buffer at step 220. At step 222 L_V(N) is set to LAST+1 where LAST is the long sequence number (L_SEQ) of the last frame delivered to the higher layer at step 218. At step 224 the frame is removed from the NAK list and the receiver 52 returns from processing the retransmitted frame at step 226.

Figure 7:
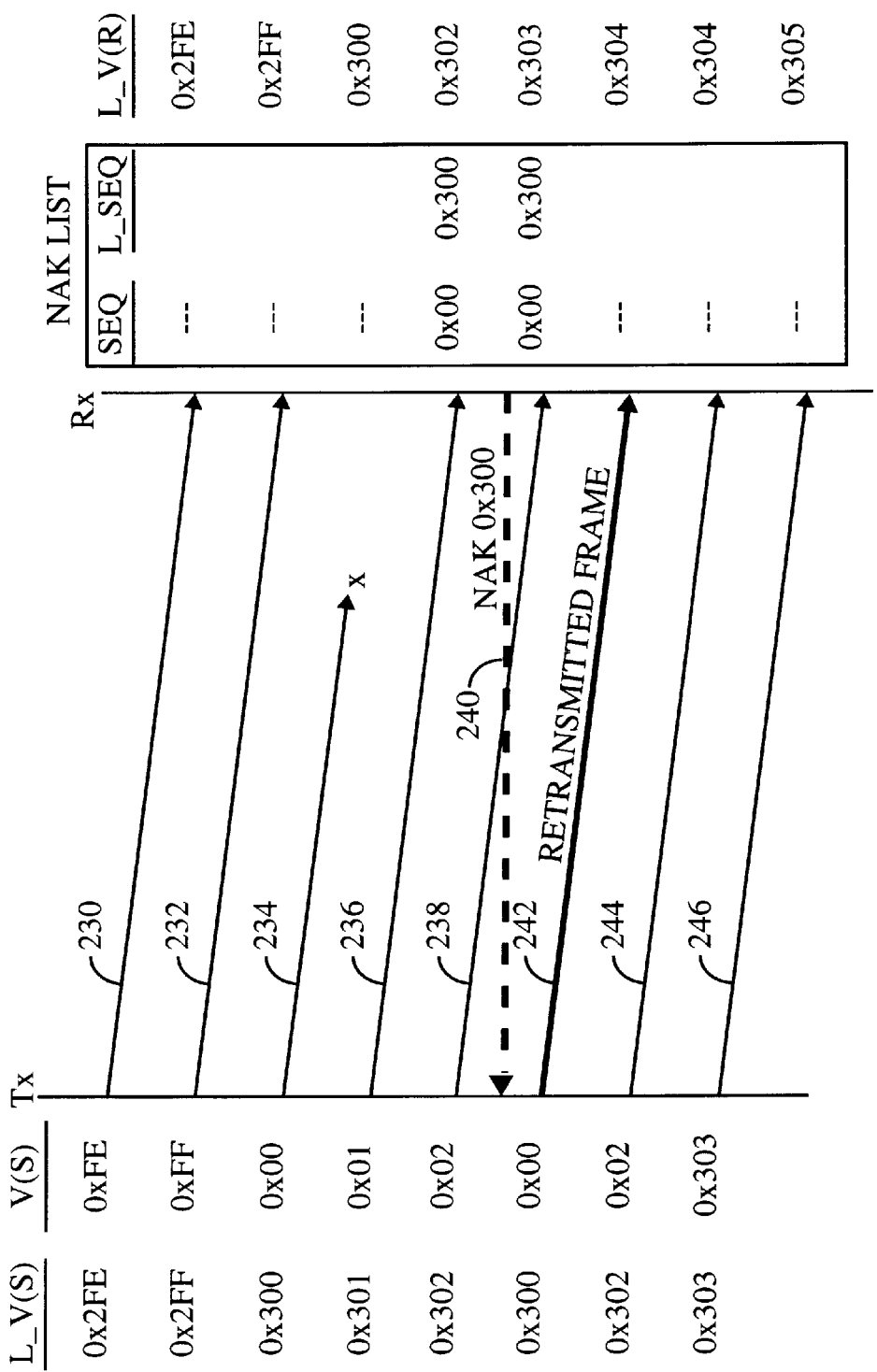
FIG. 7 is a message diagram illustrating the operation of the transmitter and the receiver during an exemplary communication.

FIG. 7 is a message diagram illustrating the messages transmitted during an exemplary communication performed in accordance with one embodiment of the invention. Transmitter 50 is shown on the left, and receiver 52 is shown on the right Transmitter 50 maintains index L_V(S) and frames are transmitted with value V(S) in the sequence field, where V(S) is the eight least significant bits of L_V(S). At the receiver 52 the NAK list after each transmission is shown. All numbers are shown in hexadecimal.

The first frame 230 is transmitted when index L_V(S) equal to 0x2FE, and therefore with a SEQ number of 0xFE. After the transmission of frame 230 index L_V(S) is incremented to 0x2FF and frame 232 is transmitted with a SEQ number of 0xFF. Both frames 230 and 232 are received successfully by receiver 52 causing index L_V(R) to increment twice from 0x2FE to 0x300.

Frame 234 is transmitted with a SEQ number of 0x00 and is not successfully received by receiver 52. L_V(S) is then incremented to 0x301 and frame 236 is transmitted with a SEQ number of 0x01 and is received successfully received by receiver 52.

Upon receipt of frame 236, receiver 52 detects the out of order sequence number because frame 234 was not received. In response, receiver 52 generates NAK message 240 containing the full twelve bit index L_V(R) for the unreceived frame 0x300. Additionally, receiver 52 updates the NAK list 94 to indicate a NAK has been transmitted for a frame with SEQ number 0x00 and L_SEQ number 0x300. Also, receiver 52 starts a NAK timer which tracks the time that has expired since the transmission of NAK message 240.

During the transmission of NAK message 240, transmitter 50 transmits another frame 238 with a SEQ number of 0x02 which is received successfully by receiver 52. Upon receipt of NAK message 240, transmitter 50 generates retransmitted frame 242 having SEQ number 0x00 and the retransmit flag 74 (FIG. 2) set to one. Upon receipt of retransmitted frame 242, receiver 52 detects the retransmission bit and matches the SEQ number with the SEQ number in NAK list 94. Once the match is made,, retransmitted frame 242 is placed within the resequencing buffer 92 (of FIG. 2) and the entry within NAK list 94 is removed. Frames 244 and 246 are then transmitted and received in normal fashion.

Figure 8:
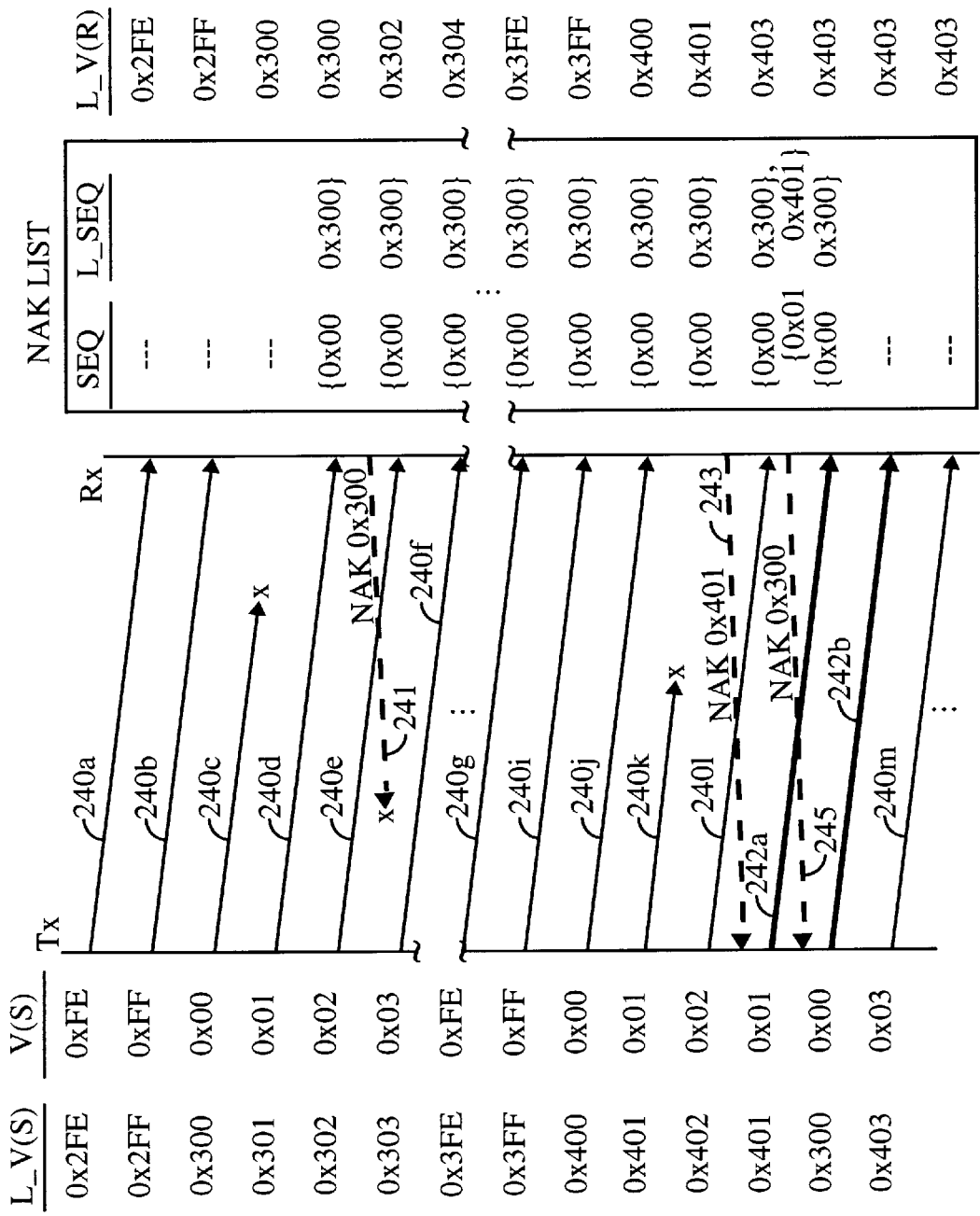
FIG. 8 is a message diagram illustrating the operation of the transmitter and the receiver during an exemplary communication.

FIG. 8 is a message diagram further illustrating the operation of transmitter 50 and receiver 52 during a transmission in which the sequence number "wraps-around," when performed in accordance with one embodiment of the invention. Frames 240a and 240b are transmitted with SEQ numbers 0xFE (all numbers are in hexadecimal) and 0xFF respectively, which correspond to values of 0x2FE and 0x2FF for index L_V(S), and are successfully received by receiver 52 causing L_V(R) to be incremented from 0x2FE to 0x300.

Frame 240c includes SEQ number 0x00 but is not successfully received by receiver 52. Frame 240d includes SEQ number 0x01 and is received properly by receiver 52. Upon receipt of frame 240d, receiver 52 detects that the SEQ number is greater than the eight least significant bits of L_V(R), and therefore that a frame have been received out of order. In response, receiver 52 updates L_V(R) to 0x302, which corresponds to the next expected frame, and places the SEQ number of the unreceived frame into NAK list 94. Additionally, receiver 52 transmits NAK 241 containing the complete L_SEQ number 0x300 of the frame that was not received, and initiates a timer which tracks the amount of time that has expired since the transmission of the NAK 241. As shown in FIG. 8, however, NAK 241 is not received successfully by transmitter 50.

Transmitter 50 continues to transmit frames as shown, including frames 240e–240j, all of which are successfully received by receiver 52. During the transmission of frames 240e–240j, index L_V(S) changes from 0x302 to 0x400, causing a wrap-around in eight least significant bits, and therefore in the SEQ number contained in the frames.

Frame 240k is transmitted with SEQ number 0x01 and is not received successfully by receiver 52. Frame 240l is transmitted with SEQ number 0x02 and is received successfully by receiver 52. Upon receipt of frame 240l receiver 52 detects an out-of-order transmission, and responds by transmitting NAK 243 containing sequence value 0x401 and by adding sequence number 0x401 to NAK list 94. Additionally, at this time the timer for NAK 241 expires causing a second NAK 245 containing sequence value 0x300 to be transmitted to transmitter 50. Thus, a second NAK is transmitted for frame 240c. Additionally, receiver 52 sets L_V(R) to the next expected sequence number 0x403. It should be noted that the sequence numbers transmitted in NAK's 243 and 245 could be transmitted in a single NAK message.

Transmitter 50 responds to NAK's 243 and 245 by transmitting retransmitted frame 242a containing the data from frame 240k, and retransmitted frame 242b containing the data from frame 240c. Upon receipt of retransmission frame 242a receiver 52 identifies the frame as a retransmitted frame based on the status of retransmit flag 74 (FIG. 2). Once the frame is identified as a retransmitted frame, receiver 52 performs a lookup within NAK list 94 using the SEQ number and determines which frame has been retransmitted. Retransmitted frame 242a is then placed in the appropriate location within resequencing buffer 92 (FIG. 2), and the corresponding entry is removed from NAK list 94.

Upon receipt of retransmission frame 242b receiver also identifies the type of frame and performs a lookup within NAK list 94. When the identity of the frame is determined, it is placed within the resequencing buffer 92 (FIG. 2), and the corresponding entry is removed from NAK list 94. Transmitter 50 then transmits frame 240m having sequence number 0x03 which is successfully received by receiver 52. At this point, NAK list 94 is empty.

As should be evident from the transmission shown in FIG. 8, marking frames as either new or retransmitted allows the receiver to properly process both new and retransmitted frames that have the same SEQ numbers even when wrap-around of the sequence number occurs during a retransmission. This is because a retransmitted frame with the same SEQ number as a newly transmitted frame can be distinguished by the retransmit flag. Thus, the present invention allows a greater number of frames to be processed using an eight bit sequence number, and therefore supports significantly higher data rates while maintaining substantial computability with preexisting standards.

Thus, a method and apparatus for extending the sequence numbering range for a selective repeat transmission protocol is described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for transmitting data between a transmitter and a receiver using a frame having a sequence number and a retransmit flag, the method comprising the steps of:
    a) transmitting the frame a first time with said retransmit flag set to false and the sequence number set to a portion of a long sequence number;
    b) incrementing a value of said long sequence number; and
    c) retransmitting the frame a second time with said retransmit flag set to true if a negative acknowledgment message containing said long sequence number of the frame is received at said transmitter.

2. The method as set forth in claim 1 wherein said sequence number is comprised of eight bits.

3. The method as set forth in claim 1 further comprising the steps of:
    receiving the frame;
    transmitting said negative acknowledgment message if the frame is received out of order based on the sequence number.

4. The method as set forth in claim 3 further comprising the steps of:
    maintaining an L_V(R) index of the next frame expected; and
    maintaining an L_V(N) index of the next frame needed for sequential delivery.

5. The method as set forth in claim 3 further comprising the step of maintaining an L_V(S) index value of the next frame to be transmitted for the first time.

6. A method for transmitting a set of data frames having eight bit sequence numbers comprising the steps of:
    a) setting a type field to newly transmitted when the data frame is first transmitted;
    b) setting said sequence number to a portion of a long sequence number;
    c) setting said type field to retransmitted when the data frame is retransmitted; and
    transmitting the data frame.

7. The method as set forth in claim 6 further comprising the steps of:
    transmitting a NAK message containing a long sequence number and updating a NAK list with said long sequence number if an out of order frame is received at said receiver;
    setting, at said receiver, said long sequence number to a first value based on a SEQ field contained in a newly transmitted frame; and
    setting, at said receiver, said long sequence number to a second value based on an entry in said NAK list if a retransmitted frame is received.

8. A system for transmitting data via frames comprising:
    transmit system for transmitting newly transmitted frames with a type field set to newly transmitted and a sequence number set to a portion of a long sequence number, for maintaining an index L_V(S) that is incremented after each newly transmitted frame is transmitted, and for transmitting retransmitted frames in response to NAK messages; and
    receive system for generating said NAK messages when said newly transmitted frames are received out of order, for maintaining a NAK list for tracking unreceived frames, and for resequencing retransmitted frames.

9. The system as set forth in claim 8 wherein said receive system is further for:
    maintaining an index L_V(R) indicating a next expected frame;
    receiving newly transmitting frames having a sequence number set to a portion of a long sequence number;
    generating said NAK message if said sequence number is greater than said next expected frame.

* * * * *